Feb. 7, 1933.　　　　　J. ROBINSON　　　　　1,896,919
AUTOMATIC TRAIN PIPE CONNECTER
Original Filed Dec. 23, 1929　　2 Sheets-Sheet 1
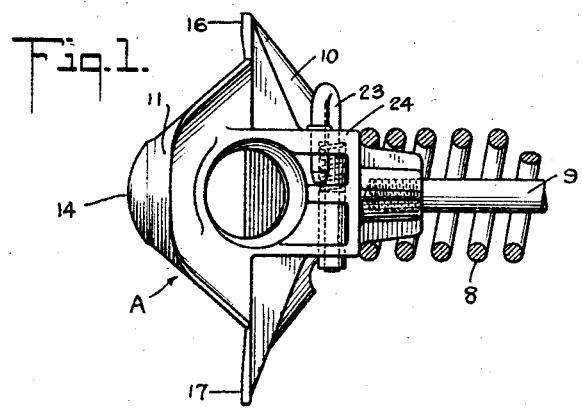
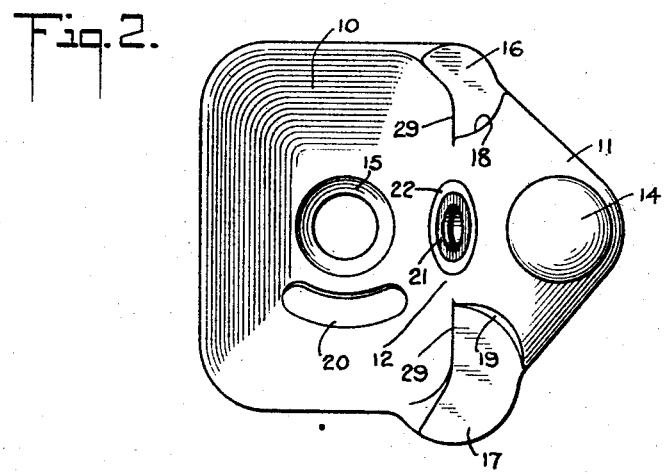
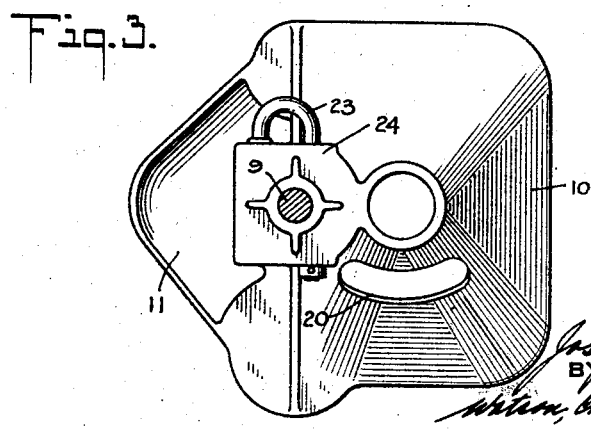
INVENTOR
Joseph Robinson
BY
ATTORNEYS Feb. 7, 1933. J. ROBINSON 1,896,919
AUTOMATIC TRAIN PIPE CONNECTER
Original Filed Dec. 23, 1929 2 Sheets-Sheet 2
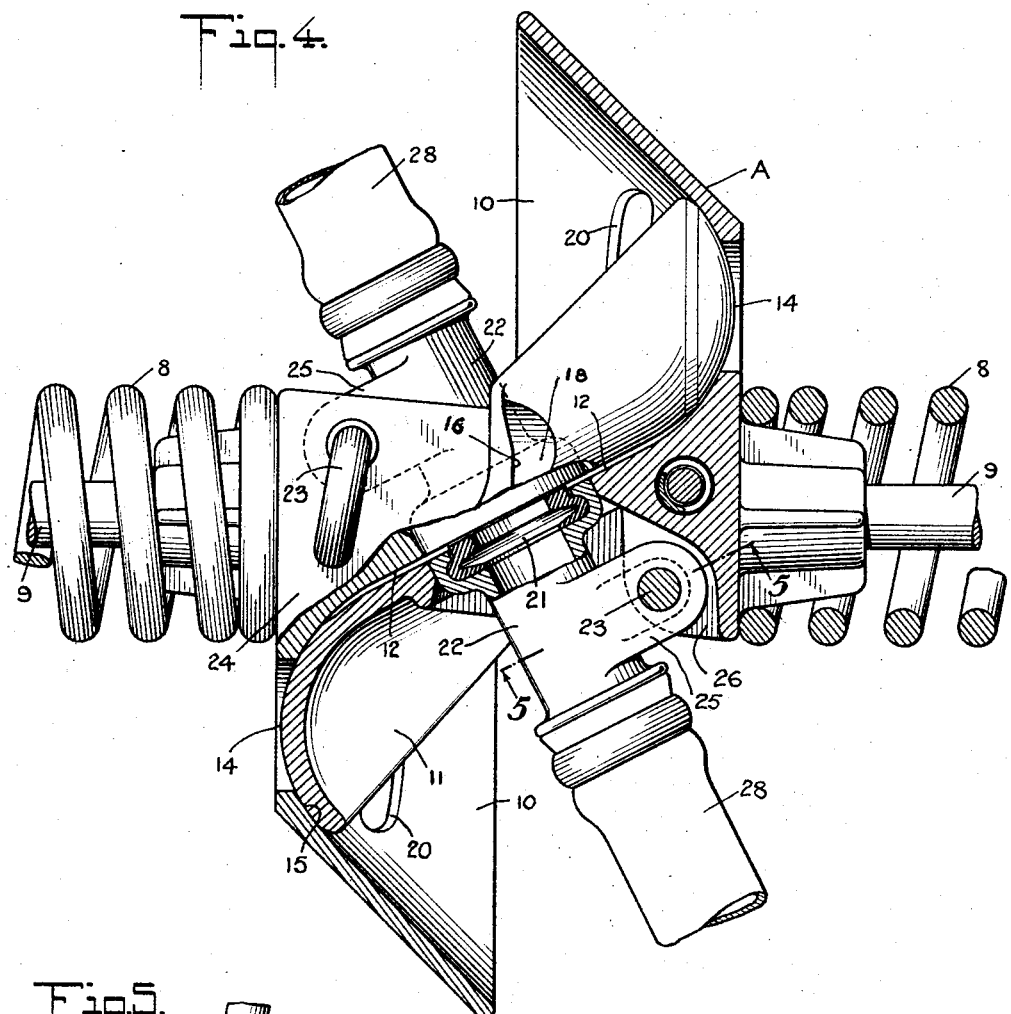
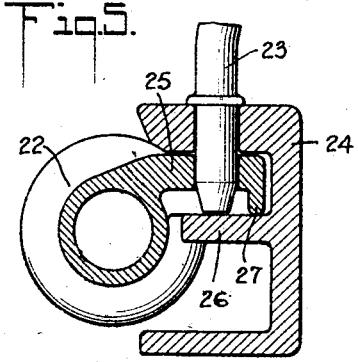

Patented Feb. 7, 1933

1,896,919

UNITED STATES PATENT OFFICE

JOSEPH ROBINSON, OF NEW YORK, N. Y.

AUTOMATIC TRAIN PIPE CONNECTER

Application filed December 23, 1929, Serial No. 416,141. Renewed June 23, 1932.

My invention relates to automatic train pipe connecters and more particularly to the coupling head of such connecters wherein the face of the head is disposed obliquely to the direction of the railroad track. Among the objects is to simplify the construction of this type of coupling head, increase its strength and compactness and reduce its cost of manufacture, and at the same time increase its coupling range and general efficiency.

In the drawings Figure 1 is a side elevation of my improved coupling head. In this view a part of a suitable form of support is shown. The hose fitting or conduit later to be described is not illustrated in this view, Figure 2 is a front elevation of the construction shown in Figure 1, Figure 3 is a rear elevation of the constructions shown in Figures 1 and 2. In this view the supporting device is omitted, Figure 4 is an enlarged detailed plan view of a pair of my improved coupling heads coupled together, and Figure 5 is a sectional detail of the conduit or hose fitting and the locking or retaining means therefor. This view is taken on approximately the line 5—5 of Figure 4.

My improved coupling head A may of course be carried by any suitable supporting means for suspending it flexibly from the car. I show the forward portion of such a support, which includes a spring 8 and an anchor or rod member 9. Such a support is fully illustrated and described in my co-pending application Serial #395,415 filed September 26th, 1929.

My improved coupling head comprises a funnel 10 lying on one side of the longitudinal center line of the connecter and a horn or pin 11 lying on the opposite side of such center line. The horn may be said to consist of an extension of the inclined wall 12 of the funnel, which wall is disposed obliquely, to any desired degree, with respect to the longitudinal direction of the track. At its outer end the horn or pin 11 is provided with a blunt portion or nose 14 adapted to seat firmly in a complementary seat or bearing 15 at the bottom of the funnel 10. Vertically disposed bearing surfaces 16 and 17 placed at the top and bottom respectively of the coupling head are provided to prevent relative movement of mated coupling heads one upon the other in the vertical direction. These bearing surfaces taper inwardly toward the center of the head. This is in order to prevent the top of one head getting under the bearing point or surface of the companion head, and fouling there in coupling. It will be observed particularly in Figure 2 that these bearing surfaces are set back with respect to the base of the horn or pin 11—that is the horn is cut away at its base as at 18 and 19 in the formation of the bearing surfaces. This arrangement is in order to permit a passenger coupling head having three ports to mate efficiently with the freight type of coupling head illustrated in which there is but one port. The two additional ports on the passenger head would be located so as to mate with these bearing surfaces 16 and 17. To prevent the accumulation of foreign substances in the funnel 10, and to greatly improve the coupling action of the coupling head A, I form the funnel to a short longitudinal dimension and likewise shape the horn 11. The result is a very shallow compact head both as to its longitudinal and lateral dimension. Making the horn 11 thus, and the funnel 10 shallow to correspond, enables the car couplers to do a large part of the aligning of the connecters as the couplers move to the service position. Further means than the relatively abrupt angling of the walls of the funnel for preventing the accumulation in the funnel of foreign substances, is provided by cutting away a part of the lower wall of the funnel as indicated at 20. Of course more metal of the funnel may be cut away at different points if desired.

It will be noted that the bluntness of the forward end or nose of the horn 11 is such as to prevent any possibility of the nose 14 damaging the gasket 21 in the conduit 22, Figure 4, in case the nose should strike against the gasket. The oblique position of the gasket with respect to the longitudinal direction of the track prevents in itself any substantial damage to the gasket in case the horn 11 should strike against the same, but by making the nose 14 of a blunt construction much greater protection against damage to the gasket is secured as the nose slides easily over the gasket in case it strikes the latter.

The conduit 22 is removably mounted in the coupling head A, with its front face in substantially the plane of the face 12 of the coupling head, by means of a spring actuated plunger pin 23 suitably mounted in the shank 24 of the coupling head. This shank is preferably integral with the head, though it may be formed separately thereof, and is cored out as shown in Figures 1, 3 and 5 to receive the conduit 22. A forwardly extending bench or rest 26 lies within the hollow opening in the shank and serves to support the laterally extending lug 25 of the fitting 22. It will be noted that this lug 25 is hollowed out on its underside. This is to reduce its thickness and still leave a surface 27 for resting on the seat 26, such surface being relatively narrow and therefore more proof against foreign substance interfering with the position of the conduit in the shank than if this surface 27 were the width of the lug.

In this construction of coupling head only one core is required in casting, the same being the core for providing the opening in the shank 24 and through the face 12 of the coupling head to receive the conduit 22, whereas in a coupling head of the type shown in my aforesaid co-pending application, on which head the present invention is an improvement, several cores are required to produce. The type of head shown in that application is comparatively expensive and weak in contrast to the present invention.

The customary train pipe hose 28 is suitably connected to the fitting 22 as shown, and the gasket 21 is of the expansible type used in most of my connecter improvements. It will be noted that the bearing surfaces 16 and 17 do not lessen the normal gathering range of the funnel 10. That is, they do not extend into the path of the flare of the funnel. Instead, that edge of these surfaces which is nearest the funnel terminates approximately in the plane of the center of the gasket 21, as indicated at 29—Figure 2. This arrangement provides the important advantage of a maximum gathering range for the head with a minimum overall dimension.

What I claim is:

1. An automatic train pipe connecter head comprising a funnel member and a pin member each disposed on the opposite sides of the longitudinal direction of the head, said pin member having a blunt rounded forward end, and said funnel having at the apex thereof a complementary seat or bearing for the pin member of a mating head, these parts being so proportioned and arranged that when they are in engagement mated coupling heads are accurately aligned, a plurality of bearing surfaces on said head arranged adjacent the base of the pin member, said surfaces being vertically disposed with their faces in a plane substantially at right angles to the longitudinal center line of the head and being tapered inwardly toward the center of the coupling head, and means on the rear side of the head for supporting the same.

2. An automatic train pipe connecter head comprising a funnel member and a pin member disposed on opposite sides of the longitudinal center line of the head, said pin member having a blunt rounded forward end, and said funnel at its apex having a rounded seat or bearing adapted to receive the blunt forward end of the pin of a mating head, said head also having adjacent its top and bottom edges substantially flat bearing surfaces arranged transversely of the longitudinal center line of the head and positioned to engage similar surfaces on a mating head, and means on the rear side of the head for supporting the same.

3. An automatic train pipe connecter head comprising a funnel member and a pin member disposed on opposite sides of the longitudinal center line of the head, said funnel member being of shallow formation with the depth thereof not greater than one half the distance across the base or mouth thereof, said funnel member having an opening in the bottom or apex thereof and a relatively large curved seat surrounding said opening, said pin member having a large rounded forward end adapted to fit the seat in the bottom of the funnel of a mating head, said pin member having the inside wall thereof merging with the inside wall of said funnel member to form a continuous wall which is disposed obliquely to the longitudinal center line of the head, said oblique wall having an opening therein on the longitudinal center line of the head, and a train pipe conduit removably mounted in said opening.

4. An integrally formed coupling head for a train pipe connecter, said head including a shank arranged on substantially the longitudinal center line of the head, a funnel member on one side of the shank and a pin member on the other side thereof, said pin member being in advance of the funnel member, said funnel member being relatively shallow with the depth thereof not greater than one half the distance across the mouth or base thereof, said funnel member having the inner surface of the bottom or apex thereof provided with a large rounded seat facing forwardly, said pin member having at its front end a large rounded nose adapted to fit the seat in the funnel member of a mating head, said pin having the inside wall thereof merging with the inside wall of said funnel member and forming a wall extending obliquely across the longitudinal center line of the head in front of said shank, said wall having an opening therein for a train pipe conduit.

5. An automatic train pipe connecter head comprising a funnel member and a pin member disposed on opposite sides of the longitudinal center line of the head, said funnel member being of shallow formation and having an opening in the bottom or apex thereof and a relatively large curved seat surrounding said opening, said pin member having a large rounded forward end adapted to fit the seat in the bottom of the funnel of a mating head, said pin member having the inside wall thereof merging with the inside wall of said funnel member to form a continuous wall which is disposed obliquely to the longitudinal center line of the head, said oblique wall having an opening therein on the longitudinal center line of the head, and a train pipe conduit removably mounted in said opening.

6. An automatic train pipe connecter head comprising a funnel member and pin member disposed on opposite sides of the longitudinal center line of the head, said members being formed integrally, said pin member having a blunt, rounded forward end, said funnel member at its apex having a rounded seat adapted to receive and fit the blunt forward end of the pin of a mating head, said head also having adjacent its top and bottom edges substantially flat bearing surfaces arranged transversely of the longitudinal center line of the head and positioned to engage similar surfaces on a mating head, a shank arranged rearwardly of said pin and funnel members and formed integrally therewith, and head supporting means connected to said shank.

In testimony whereof I hereunto affix my signature.

JOSEPH ROBINSON.